United States Patent

[11] 3,586,190

[72] Inventor James W. Lafferty
 Palos Verdes Estates, Calif.
[21] Appl. No. 712,980
[22] Filed Mar. 14, 1968
[45] Patented June 22, 1971
[73] Assignee The Elwel-Parker Electric Company

[54] MOBILE PRECISION RIGGING APPARATUS
 15 Claims, 12 Drawing Figs.
[52] U.S. Cl.................................................. 214/620,
 214/1, 214/730, 214/670
[51] Int. Cl.................................................. B66f 9/12
[50] Field of Search............................................ 214/620, 1
 D, 730, 75

[56] References Cited
 UNITED STATES PATENTS
2,620,930 12/1952 Mullgardt......................... 214/1 (D)
2,733,825 2/1956 Evans............................... 214/672
2,780,377 2/1957 Glenn, Jr. et al.............. 214/620 X
2,804,218 8/1957 Sylvester et al............... 214/514 X
3,050,206 8/1962 McCracken...................... 214/620
3,086,618 4/1963 Christiansen.................. 214/620 X
3,087,630 4/1963 Karnow et al................. 214/1 (D)
3,176,861 4/1965 Paul et al....................... 214/75 (H)
3,235,105 2/1966 Loomis............................ 214/75

3,264,026 8/1966 Hansen........................... 214/620 X
2,634,875 4/1953 Trautner....................... 214/730
 FOREIGN PATENTS
1,338,707 8/1963 France........................... 214/730
 OTHER REFERENCES
 NEWSWEEK MAGAZINE, March 31, 1952, Page 42
 MECHANIX ILLUSTRATED; Oct. 1952, page 89

Primary Examiner—Gerald M. Forlenza
Assistant Examiner—Robert J. Spar
Attorney—Ely & Golrick ABSTRACT: As a load manipulating fixture unit, two like hydraulically extensible columns mounting load-engaging fittings are supported on carriages hydromechanically shiftable for independently controlled transverse and fore and aft motions on a base receivable in the manner of a four-way pallet on the high lift platform of a high capacity industrial truck, providing a hydraulic power takeoff to the unit and having precision platform lifting-lowering, and vehicular steering, speed and acceleration control. Independent three-dimensional motions of each load fitting relative to the base, permitting shifting to accommodate and to change attitude of particular loads and complementing truck vehicular and lift motions, enable easy accurate manipulation of massive and/or bulky loads, e.g., in rigging operations, by single or joint truck action. A similar palletlike unit with opposable hinged load engaging faces is disclosed.

INVENTOR.
JAMES W. LAFFERTY
BY
Ely and Golrick
ATTORNEYS

INVENTOR.
JAMES W. LAFFERTY

INVENTOR.
JAMES W. LAFFERTY
BY
*Ely and Golrick*
ATTORNEYS

MOBILE PRECISION RIGGING APPARATUS

In the building, installation, maintenance or servicing of extremely large and heavy machinery, of large aircraft, or of ships, massive and bulky parts or components often have to be manipulated and moved quite precisely into or from position relative to other structures. Thus in millright work large and/or heavy gears, shafts or structural components must be inserted into position or located for securement relative to other structure. In shipyards, for example, very large or heavy propellers, propeller shafts, rudders, and sonar domes must be installed or removed from an underportion of the hull or a location overhung by part of the hull or other equipment of the ship. Similar problems are at times encountered in large aircraft. All such operations for convenience are herein denominated by "rigging" as a general term.

In such rigging operations, frequently the location where work is to be done, or the nature or shape of massive or extended components to be removed or assembled are such that the work region is effectively inaccessible for the use of gantry cranes and similar load moving equipment, or the nature or location of the operations may be such that gantries are not readily available for the work. At times similar conditions may also preclude the use of scaffolding and ancillary equipment thereof for the work. For such situations it has at times been proposed and attempts have been made to use forklift industrial trucks, but this has been found on the whole unsatisfactory either by load limitations of the trucks, or more particularly by practically inherent limitations, especially as to precision, upon the motion available in the mobility of, and the control of speed, acceleration, and steering of the truck as a vehicle, and in the forklift motion, and perhaps by vertical dimensions of the truck equipment limiting approach to the work location. Also unevenness of the vehicle supporting surface often has made it difficult to obtain a disposition of the truck relative to the work even in those cases otherwise susceptable to industrial truck use for such purposes.

It is the general object of the present invention to provide an apparatus and method affording a system adapted to manipulate large loads in such rigging operations while avoiding the disadvantages and limitations inherent in the use of cranes, scaffolding, and forklift trucks as hitherto has been the practice.

Another object is to provide a rigging system through a method and apparatus utilizing the mobility of industrial trucks to bring load handling equipment into operation with dispatch and thereby avoid the necessity of assembling and disassembling scaffolding or ancillary load handling equipment in a general work area, resulting in a general savings of time and expense in the work to be accomplished, and also eliminating the obstruction of the work area by such prior used equipment.

A still further and more particular object of the invention is the provision of a method and of apparatus for a rigging system whereby massive and large components may be manipulated with dispatch and quite precise movement and positioning.

These and other objects and advantages are obtained in accordance with the present invention by the use of a high load capacity, high-lift platform industrial truck of a generally known type, wherein by known design considerations and means there are provided precision-controlled platform lifting and lowering, precision-controlled steering, speed and acceleration of the vehicle; and in, combination therewith a cooperating load-engaging and manipulating fixture of what may be termed a palletized type. This fixture is adapted to be received on the truck platform, and further to impart to the load thereby carried further motions complementary to those available in the truck as such, whereby the load may be finally quite precisely located relative to the work environment, and conversely the load receiving and engaging elements may similarly be positioned to receive a load to be removed from the environment. Accordingly the fixture is provided with appropriate powered units imparting the requisite complementary motions to load engaging fixtures and thus to the load itself, and preferably such units are in turn powered from power sources available on the truck.

Particular apparatus and the method of using the same for providing a system in accordance with the invention are hereinafter described in greater detail, with reference to the following drawings wherein.

Figure 5:
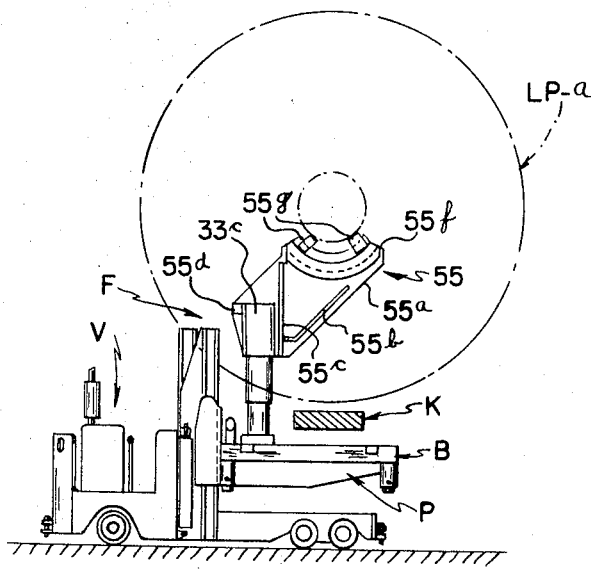
Figure 4:
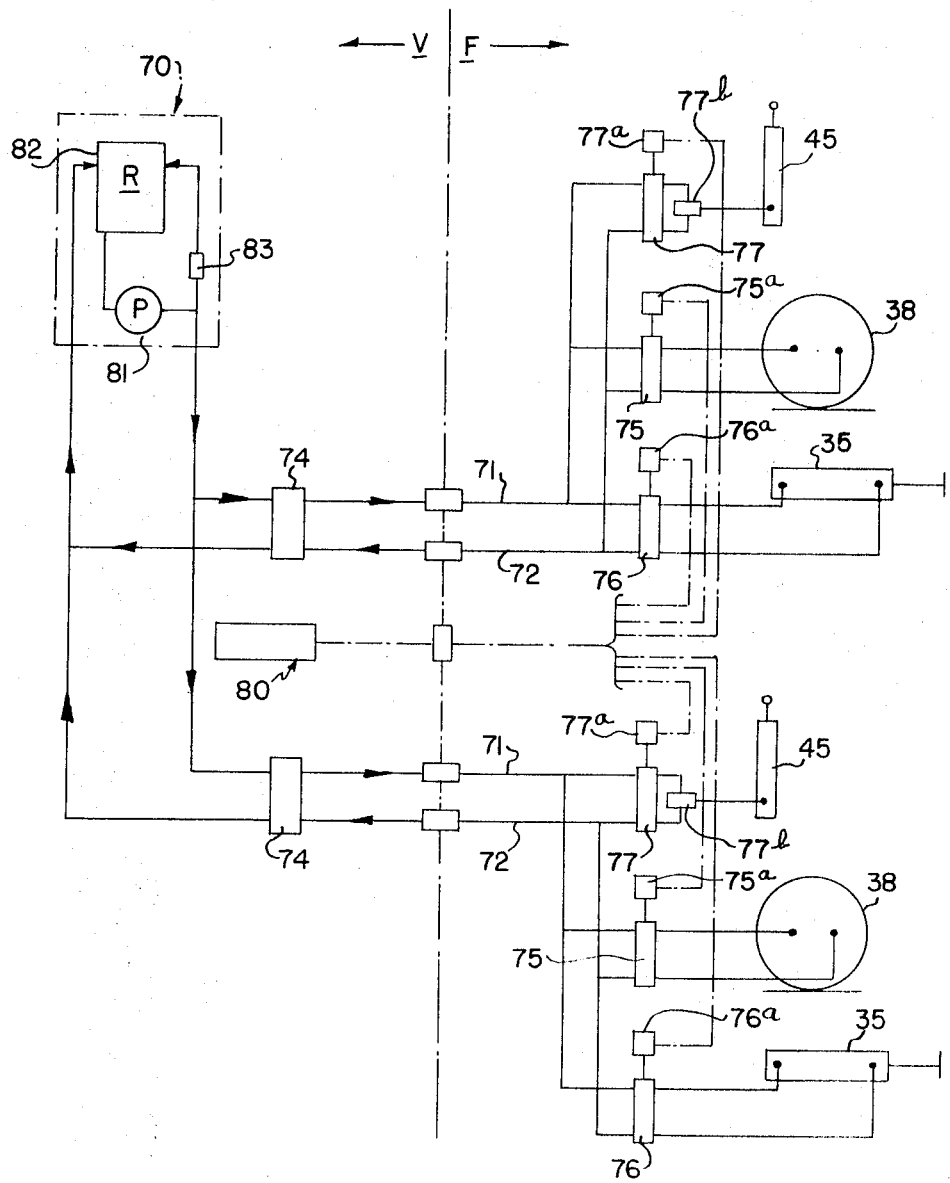
Figure 7:
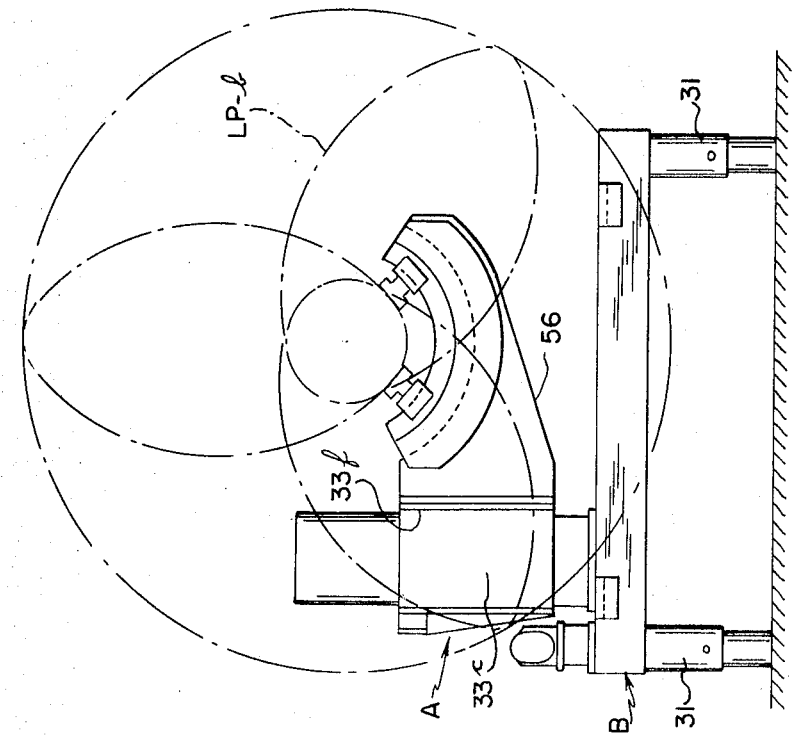
Figure 6:
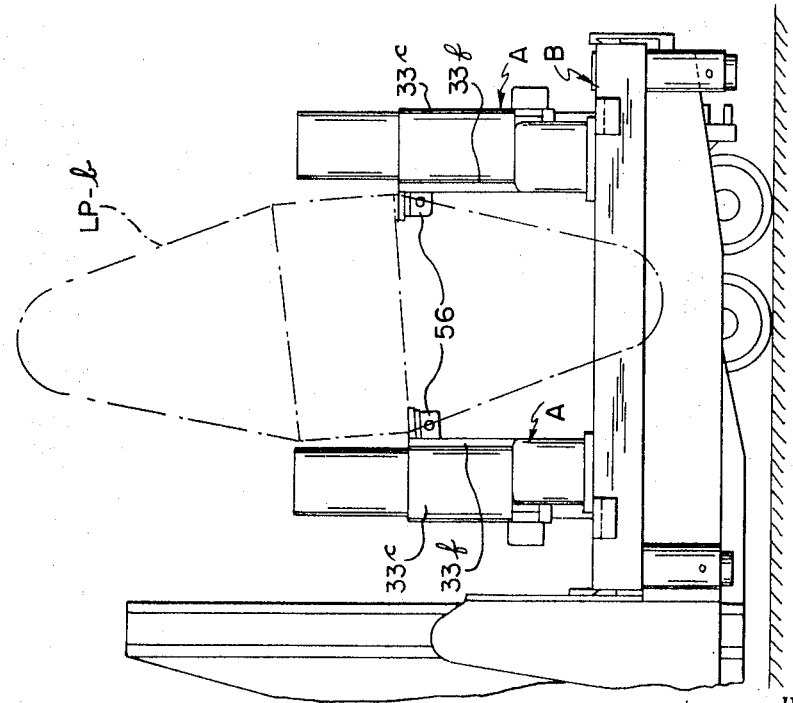
Figure 8:
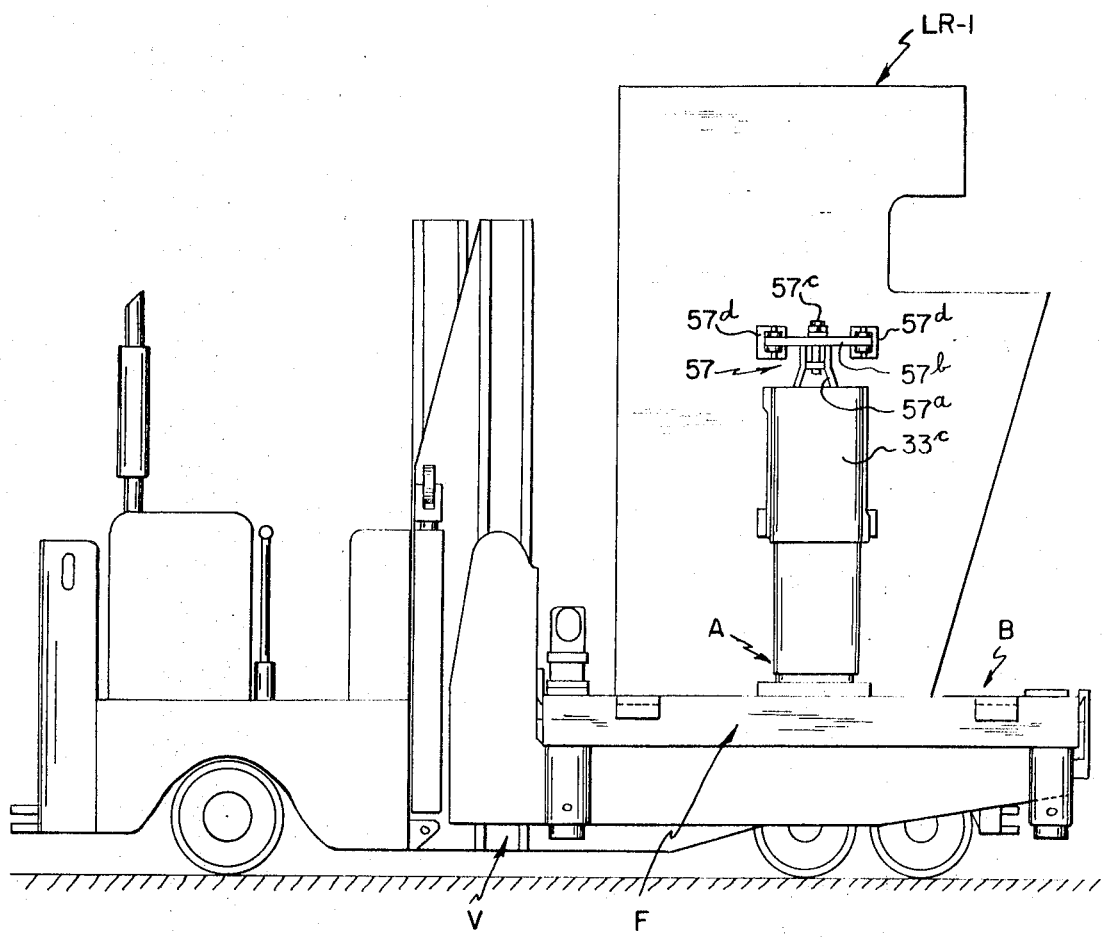
Figure 9:
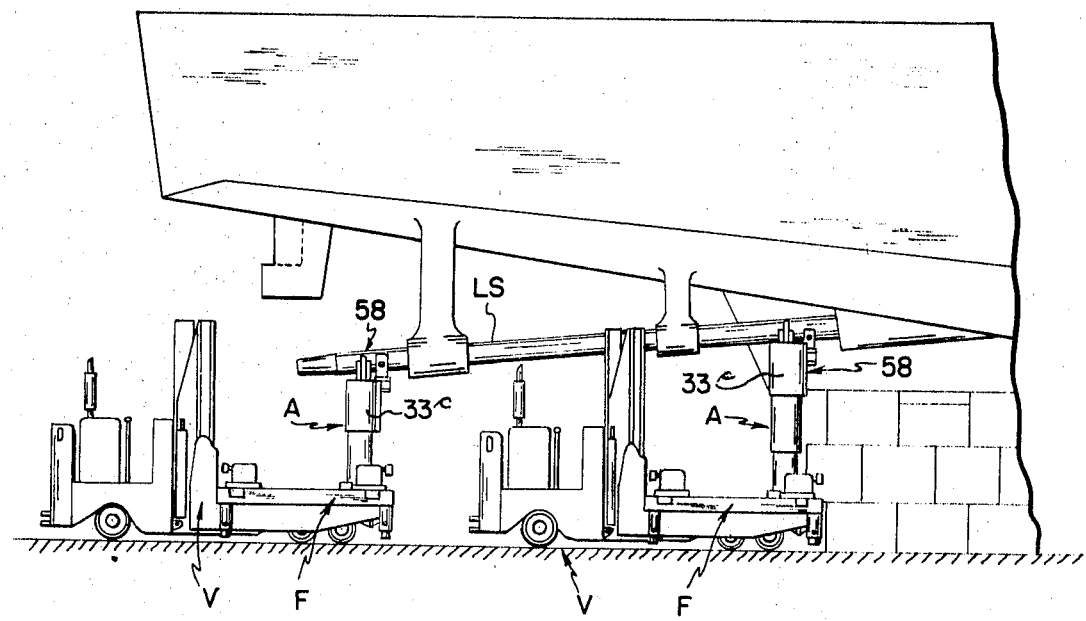
Figure 10:
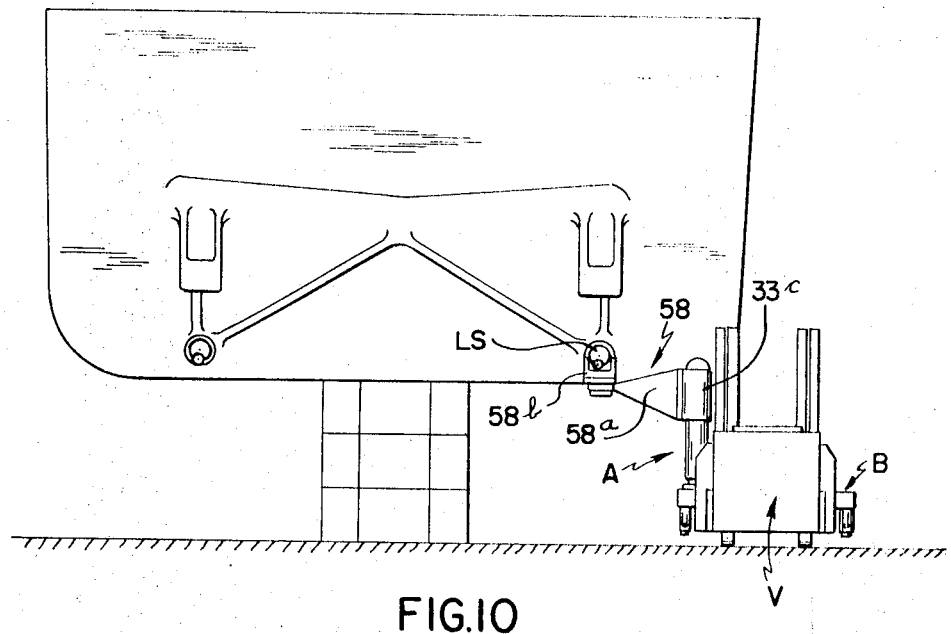
Figure 11:
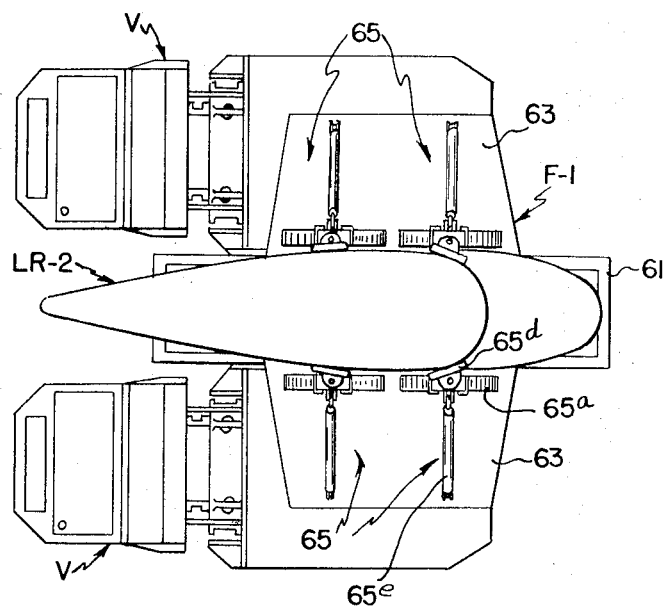
Figure 12:
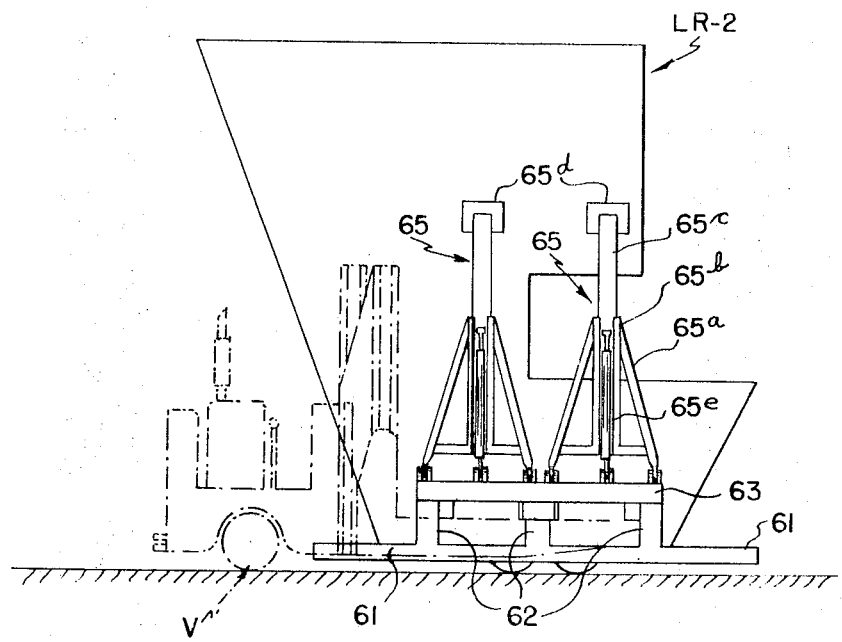

FIG. 4 outlines controls for the fixture;

FIG. 5 is a right side view of the truck load handling fixture combination equipped with a special fitting for engaging a particular large propeller load there represented in outline form;

FIG. 6 is a fragmentary outline view in side elevation showing the fixture as supporting another form of propeller load on the truck platform;

FIG. 7 shows in front end view the load handling fixture and load of FIG. 6 as resting upon a working area or dock floor;

FIG. 8 is a fragmentary right side elevation of the front end truck-fixture combination supporting a large rudder as a still different form of load with appropriate fitting;

FIG. 9 is a fragmentary starboard elevation of the stern portion of a ship, showing two truck-fixture combinations jointly acting in the installation or removal of a propeller shaft;

FIG. 10 is a stern elevation corresponding to FIG. 9;

FIG. 10 is a stern elevation corresponding to FIG. 9;

FIG. 11 is a plan view showing another form of load handling fixture of a saddle type jointly supported on the platform of two similar trucks; and FIG. 12 is a side view of the fixture of FIG 11, with the relative position of a cooperating truck shown in dashed outline.

Figure 1:
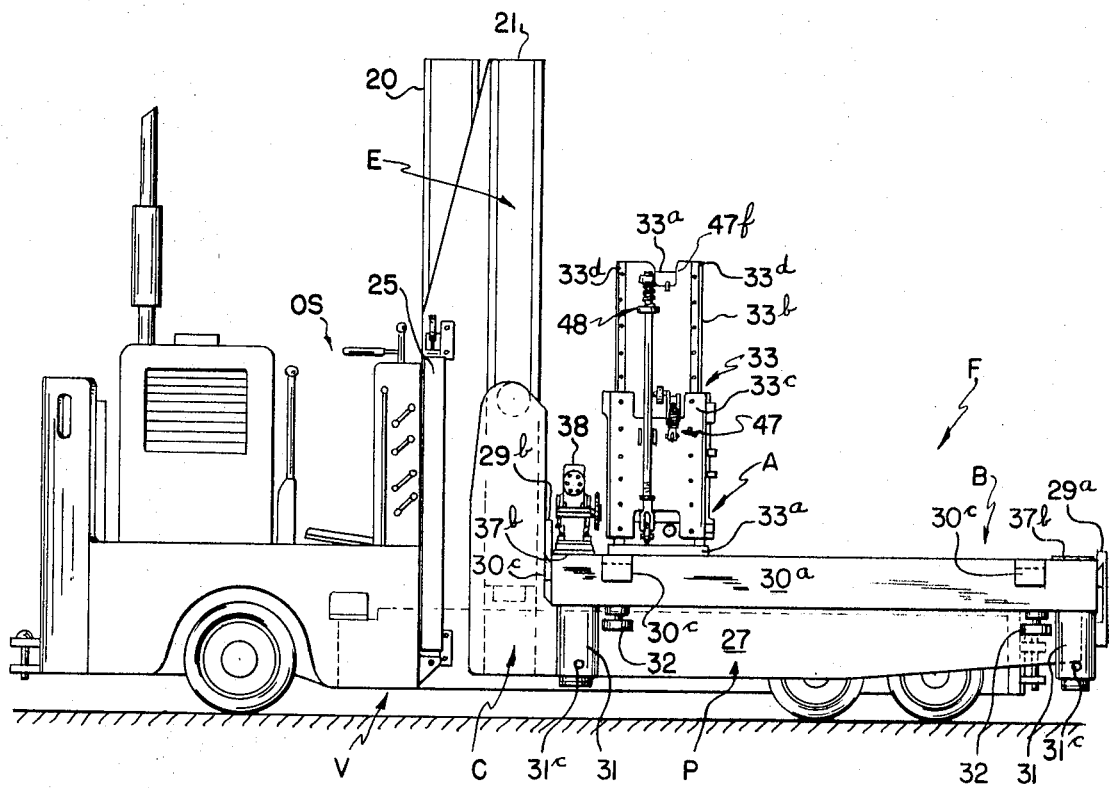
FIG. 1 is a right side elevation of an industrial truck the platform of which carries one pallet-type load-engaging and manipulating fixture in accordance with the present invention.
Figure 2:
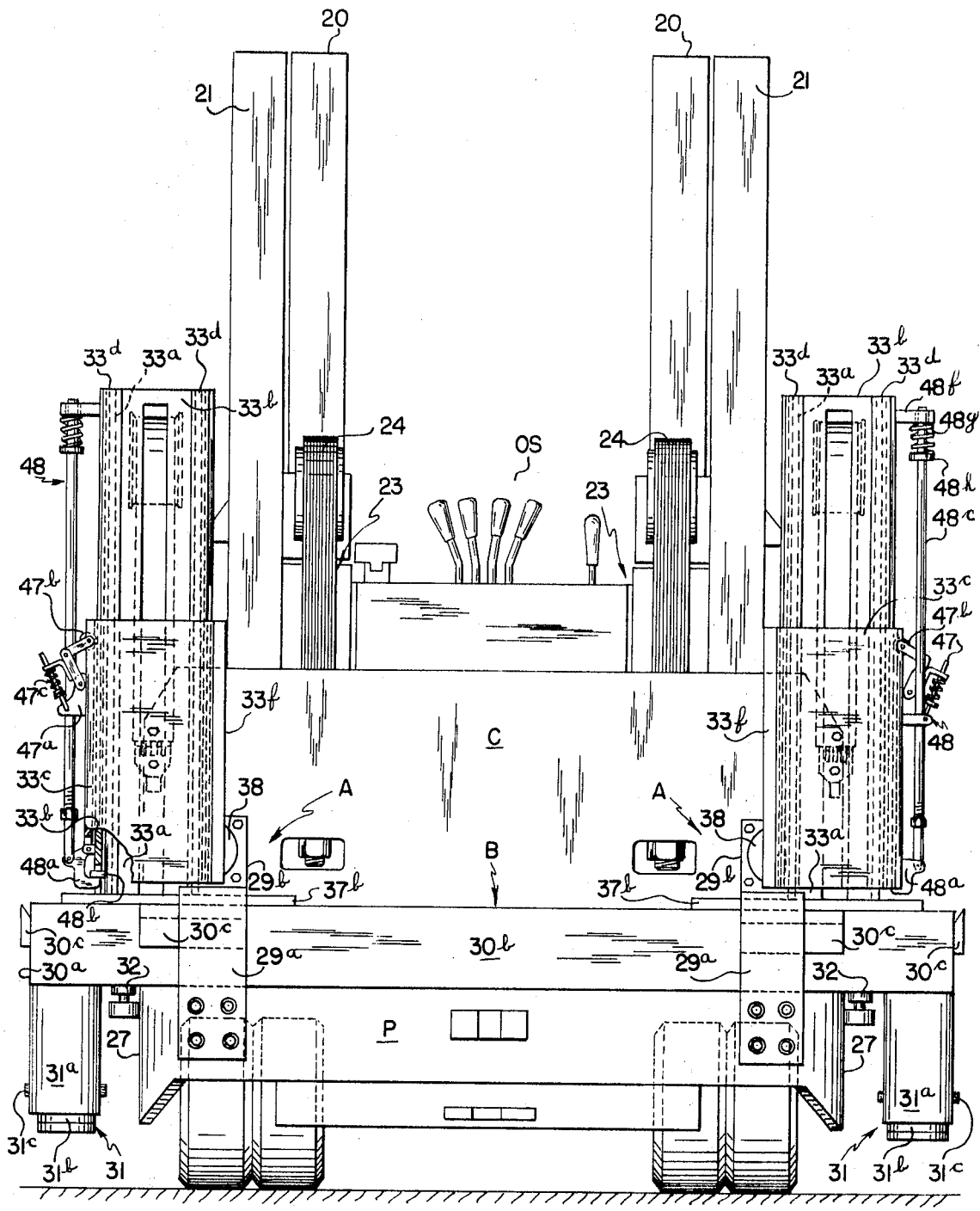
FIG. 2 is a front elevation corresponding to FIG 1.
Figure 3:
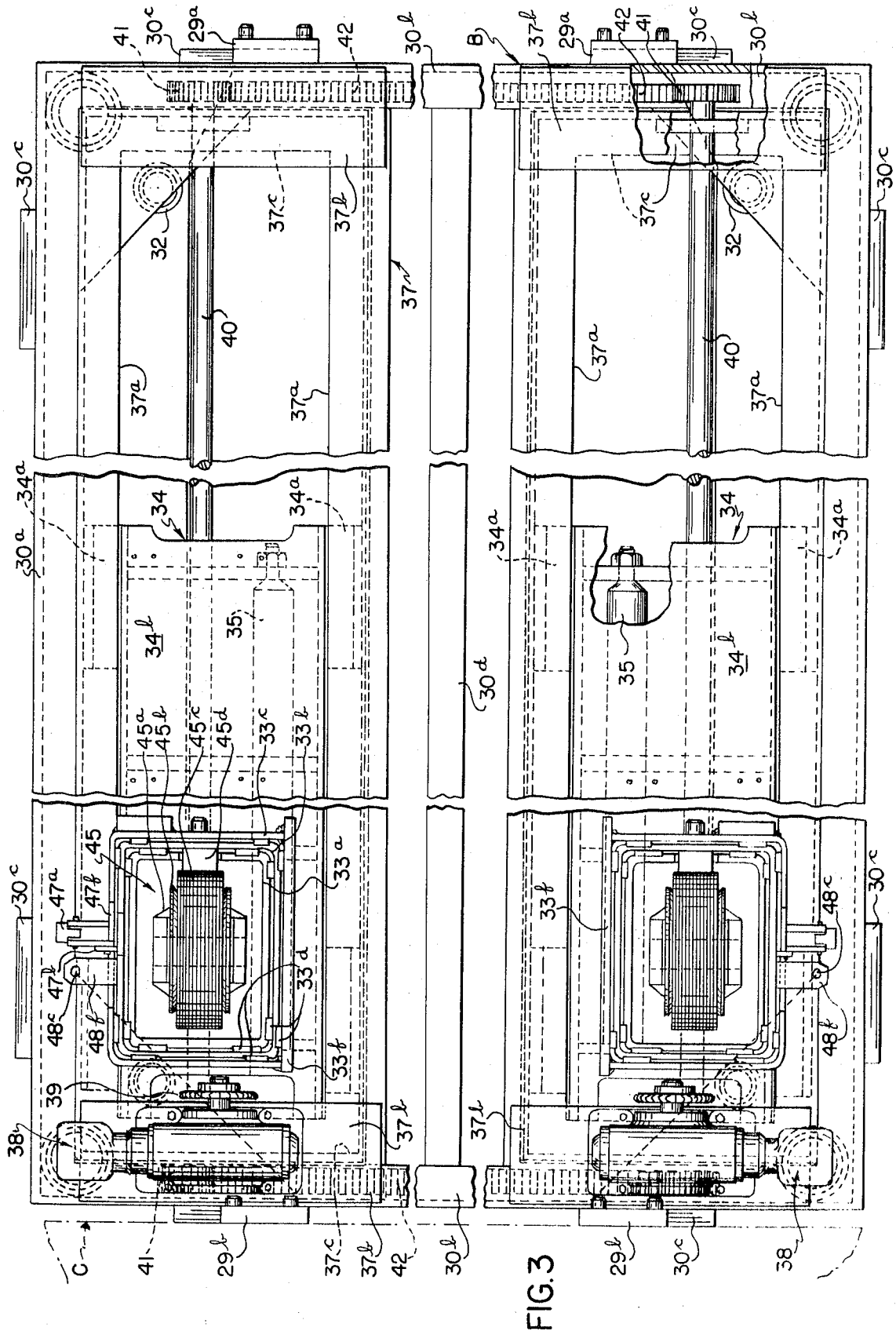
FIG. 3 is an enlarged plan view of the fixture shown in FIGS. 1 and 2.

One form of apparatus for carrying out the invention is shown in FIGS. 1, 2 and 3; comprising a heavy duty, high load capacity, high-lift platform industrial truck, designated as a whole by the reference character V; and in combination therewith, the complementary load-engaging and manipulating fixture, designated as a whole by the general reference character F, supported on the truck platform, on and from which it is picked up, carried and deposited in the manner of a pallet.

In truck V the steering mechanism, the vehicle drive with speed and acceleration controls, and the platform lift system and controls are such as to afford to the operator easy precision control of the several functions thereof; and the truck capacity may be even on the order of 70,000 pounds for the loads currently contemplated. The general structure and functions of such a truck are well known to, and may be provided by many variant designs of, the industrial truck art. Preferably hydraulic lift and, to simplify the desired precision control as contrasted with internal combustion engine propulsion, an electric motor vehicle drive are used; powered either by batteries or, as here shown, by a diesel, gasoline or LPG engine-driven generator.

The truck load-support platform P is rigidly secured on an elevator carriage C which, by suitable motor means, is raised and lowered on an extensible elevator structure E. The latter structure is comprised of a fixed first pair of laterally spaced parallel channel uprights 20 as a frame fixed on the chassis; and, in front of the fixed pair, a second pair of bottom-yoked, spaced parallel channel uprights 21 as an extensible frame vertically movably supported and guided by rollers engaged in the outwardly facing fixed upright channels. The inwardly facing channel formations of the second pair in turn provide guideways for rollers on the back of the carriage.

As preferable lift motor means, first there is provided a spaced pair of parallel-acting hydraulic piston-cylinder units 23, each having its cylinder secured on a bottom cross-yoke portion of the movable frame and on its piston rod a sprocket or sheave-type head bearing against a respective chain 24, with ends secured to the back of the carriage C and to the movable frame 21; thereby providing a 2 to 1 motion multiplying mechanism for the carriage relative to the frame 21. Secondly, to raise and lower the movable frame relative to the fixed frame, on opposite sides respective piston-cylinder units 25 are operatively secured between the truck chassis and the rearwardly extending, roller-carrying bracket or sideplates of the frame 21.

Electric motor-driven hydraulic pumps are provided on the truck for powering the respective lift cylinders and also to provide hydraulic takeoff for powering the fixture components F as hereinafter described. Suitable electric and hydraulic valve and control circuits are provided on the truck for raising the platform relative to the movable frame and the latter with the platform relative to the fixed elevator frame; all in accordance with means, structures and modes of operation well known to the prior art. Since these and other particular structures, devices and components of the truck V as an industrial truck are old and well known to the prior art, and per se are not invention to be claimed here, they are not further detailed.

The fixture structure F is generally symmetrical about its center plane, coincident with the longitudinal center plane of the truck for the disposition on the truck as shown in FIGS. 1—3. For convenience of description this plane of symmetry is considered the longitudinal center plane of the fixture. The fixture is comprised of a palletlike base B and at each side shiftable, like load fitting support assemblies A. Each assembly A includes a vertically extensible three-element telescoping column, indicated by a general reference numeral 33, supported by a respective horizontal translating carriage mechanism M for movement longitudinal and transverse of the base, which movement, for the fixture disposition of FIGS. 1—3, is also longitudinal and transverse of the truck; whereby a respective load fitting mounted on a carriage portion 33f is universally movable.

The base B is formed by pairs of facing channel members 30a, 30b secured together as a rugged hollow, rigid open square frame, which is provided with telescoping or retractable legs 31 at the respective bottom-gusseted frame corners. Also four guide rollers 32 extend downwardly from the frame, each located on a diagonal of the square frame inwardly from a respective leg. The rollers of each pair thus appearing at each side of the square are spaced just slightly wider than the truck platform width defined by the transverse spacing of the dependent platform skirts 27, which are engaged by respective rollers as guide and centering rollers in picking up and depositing the fixture. As the defined spacing of the roller pair seen on each side of the base allows insertion of the platform from all sides, the base assumes in effect a four-way pallet-type configuration. Each leg 31 is maintained either in retracted condition as shown in FIGS. 1—3, or in a selected extended position as in FIG. 7 providing a base bottom height greater than the minimum platform surface height to allow convenient platform insertion and withdrawal with the fixture on a floor. This is achieved by a retaining pin 31c passed diametrically through an upper cylindrical leg portion 31a and the therein telescoped lower section 31b diametrically perforated at a plurality of axial locations for leg length selection.

Each horizontally translating carriage mechanism comprises an inner or slide carriage frame 34, by lateral slide shows 34a slideably mounted in rigidly spaced facing longitudinal slideways 37a provided by an outer open rectangular carriage frame 37. The frame 37 for transverse sliding motion toward and away from the center plane of the fixture (i.e., the central longitudinal reinforcing member 30d joining 30b-30b) is supported dependently within the base by heavy plates 37b welded on underlying transverse end members 37c. The carriage frame 37 is thus supported projecting endwise over, and through bottom wear plates slideably bearing on, the respective top flanges of the front and back channel-shaped transverse base elements 30b; the flange edges of the latter affording parallel end guides disposed respectively adjacent the carriage frame end members 37c. Each assembly A is stabilized and retained on the base by a bar secured on the inner edge of the frame 37 to project endwise under flanges of respective base members 30b.

Beneath the top plate 34b in each horizontal carriage mechanism, a double-acting hydraulic piston-cylinder unit 35, extending parallel to the slideways 37a, is operatively connected at opposite ends between the inner carriage frame 34 and to the end member 37c at the back of the outer carriage frame to provide the longitudinal movement. For the transverse movement, on the back end of the carriage frame 37 there is located a reversible hydraulic motor-gear reduction unit 38 having an output shaft drivingly connected by chain and sprocket means 39 to an underlying long shaft 40 rotatably supported by, and having opposite ends projecting through, the outer frame 37 to support pinions 41, 41 meshed in respective racks 42, 42 extending along the bottom flanges of the front and back base frame members 30b. These linear and rotary motors 35 and 38 are powered by a pressurized hydraulic liquid source mounted on the truck; and preferably controlled from the operator's station OS of the truck.

To retain the fixture on the truck, the four base sides each have a pair of symmetrically disposed welded-on keying or anchor plates 30c with inwardly sloped or beveled top edges; two opposite pairs of which, depending on fixture orientation on the platform, are engaged by corresponding pairs of clamping plates having complementary bevels, namely, plates 29a bolted to the front vertical face of the carriage C and plates 29b bolted to the platform front skirt.

Each telescoping columnar structure 33, to provide vertical movement for a load carrying fitting mounted on a vertical face plate 33f, includes: an inner hollow rectangular fixed post or column portion 33a secured at a selected location by bottom flange bolts to the inner carriage top plate 34b; a surrounding second hollow rectangular section as a movable post 33b of about equal height; the latter post in turn surrounded by a shorter vertical carriage portion 33c likewise of hollow rectangular cross section. Vertical slide bearing or wear plates such as 33d with underlying shims on the corner-adjacent portions of the members 33a and 33b provide localized sliding bearing surfaces and adjustable clearances for their respective surrounding members. Vertical carriage motion is provided by a hydraulically actuated mechanism 45 coaxially mounted in the column assembly. Mechanism 45 includes a single-acting piston-cylinder unit 45a with its end bearing against a suitable support at the bottom of 33a and its piston rod acting (through a sprocket or sheave-type head 45b) against a chain 45c. With this chain secured at one end to the interior of the fixed column element 33a and at its other movable end secured to the inside face bottom end of the vertical carriage element 33c by an anchor block 45d accommodated in vertical, parallel slots through 33a and 33b, there is provided a 2 to 1 motion multiplication.

For safety and to stabilize the assembly 33 in vertical movements, there is provided suitable latching means comprising a latch device 47 acting between carriage 33c and the tope of 33b; and a second latch means 48 acting between 33a and 33b.

Latch 47 comprises a latch arm 47a, pivoted on vertical carriage 33c opposite the load fitting mounting face 33f and having a roller 47b biased by spring 47c to normally bear upon the adjacent vertical face of 33b; the arm tending to latch over a cooperating top-notched portion 47f of 33b when the carriage 33c reaches the top region of 33b in a normal initial lift. However, the roller 47b first comes to bear upon a top portion of 33a behind the notch 47f, preventing arm latching until initial motion of 33b clears the roller 47b to move inward over the top end of 33a, with the final arm latching effected over the notch edge 47f.

On the reverse downward motion the outer or vertical carriage member 33c accordingly is held at the top of 33b until the latter reaches its full downward travel, whereupon the roller 47b encountering the top edge of 33a is displaced outwardly, freeing the carriage 33c for its final descent along 33b.

The latch mechanism 48 comprises a latch arm 48a pivoted upon a bottom end bracket on 33b to project, through bottom notches of carriage 33c and member 33b, into engagement with a cooperating latch block 48b secured on the bottom of fixed member 33a. A pull rod 48c with bottom end linked pivotally to arm 48a, its intermediate portion laterally supported by a channel-shaped structure 48j on the carriage 33c, its upper end slideably supported near the upper end of 33b by bracket 48f, and downwardly biased for latching by a spring 48g interposed between the bracket 48f and a stop block 48h, releases the latching upon engagement of 48j with stop 48h upon rise of the carriage 33c to uppermost position relative to 33c.

Accordingly as vertical carriage 33c rises to the top of 33b, the latter is released from 33a, so that (with continued motion allowed through compression of spring 48g) not only are the inner members unlatched from each other, but the latch 47 comes into operative position for the latching upon rise of the intermediate member. Thus the vertical carriage first stays latched by 47 to the intermediate member during the latter's downward motion; and is then unlatched to begin downward movement relative to 33b, allowing 48 to relatch by the action of spring 48g.

For flexibility in and ease of setup for particular applications, a plurality of threaded apertures are preferably provided, first in sets along the top plates 34b of the inner horizontal carriage for bolting the columns 33 in various positions or orientations thereon; and secondly, also on the heavy vertical plate 33f of the vertical carriage, which is provided in each column 33 on the side opposite the above-described latching mechanisms, as a base for mounting various load-engaging fittings respectively adapted to particular loads to be handled as hereinafter exemplified.

For communication of hydraulic power from the preferably electrically powered, pressurized hydraulic liquid source system 70 (see FIG. 4) on the truck vehicle proper to the rotary and linear hydraulic motors in each of the shiftable column assemblies A at either side of the fixture, suitable pressure and return hydraulic hose lines 71, 72 (shown only in schematic FIG. 4) are provided having quick-disconnect-type couplings to corresponding fittings on the truck. Preferably as shown, such a pressure and a return line pair is provided for each assembly A, the connections of which to source 70 are controlled by a respective solenoidal or manual three-position, four-way valve 74 on the truck; while on the fixture similar solenoidally operated three-position, four-way valves 75, 76, 77 control the individual functions of 38, 35, 45 on each side of the unit by operation of pushbutton switches in a panel 80 at the operator's station on the truck.

Since a double-acting piston-cylinder unit 35 is used to move the inner carriage fire and aft as desired, and the hydraulic motor in 38 is reversible, the valves 76, 75 provide two opposite settings affording reversed connections of the hydraulic devices to lines 71, 72, and, as preferred at least for cylinder 35, a third position blocking flow for holding.

Though with specific designs or for particular loads, hydraulic cylinder unit 45 could advisably be double-acting, because of the weights of the movable components involved in a column 33 as a whole as well as the contemplated loading, the cylinder 45 is shown as a single-acting cylinder. For this arrangement the solenoidal valve 77 could be simply a two-way, three-position valve selectively to connect cylinder 45 to line 71 or to the return line 72, or to lock fluid in the cylinder 45, respectively to extend, lower or to maintain a selected height of the vertical carriage 33c. However, valve 77 is similar shown to 75, 76 with its two controlled ports connected through a pilot valve 77b to cylinder 45 to achieve the same result.

The electrical circuitry is indicated in FIG. 4 by a block diagram function representation, the dashed lines from solenoids 75a, 76a, 77a to panel or console 80 representing appropriate electrical circuitry, whereby the solenoids and hence valves are actuated in response to function setting pushbutton switches on operator's panel 80; the circuitry including a conductor cable from fixture to truck separable by a multiconductor connector.

The hydraulic source system 70 comprises an electric motor-driven pump 81 drawing fluid from a reservoir 82, pressure setting and relief valve means 83 in the pump discharge line having a relief return line to the reservoir, appropriate electrical controls for the pump, and other conventionally related elements, not shown, as known to the art. This system 70 preferably is the hydraulic source for operating the truck lift cylinders 23, 25. If desired, to minimize the required capacity in 70, the truck lift system and the several hydraulic devices in the assemblies A may be operated one at a time; with suitable control interlocks provided to ensure this.

A desired position, of a load engaging or support fitting in an assembly A, relative to the base B is accordingly attained with power source 70 operating, by setting the valve means 74 to connect the source 70 to the hoses 71, 72 of that assembly, and then successively operating switches on panel 80 to impart requisite motions to the involved vertical carriage 33c. Apart from individual motions, with sufficient capacity in source 70, both columns 33 (hence load fitting on vertical carriages 33c) may be simultaneously moved, at the same speed or differentially: (a) parallel to each other in the same or opposite senses, longitudinally of the fixture; or (b) transversely of the fixture, simultaneously toward or away from each other, or together in the same directional sense; and (c) vertically in the same or opposite senses. Accordingly changes in load attitude, in effect a rotational shifting, may be had by simultaneous or successive differential motion.

In subsequent figures of the drawings there are shown several ways of utilizing the combination for diverse massive heavy loads, with the carriages 33f provided with appropriate fittings; the latter assuming, as required, specific forms adapted to the loads. However, it should be clear from the aforegoing description that a truck can be maneuvered into an approximate position relative to a load to be received or conversely, with a load already in position, can be maneuvered into approximate position relative to the location where the load or part is to be placed, by use of the ordinary vehicular motions and also suitable platform lift motion. Thereafter any finer and definitive motion or positioning is attained by appropriate actuation of the several devices and motors available on the fixture F to move load-engaging fittings into contact with a load to be removed or conversely shifting a supported load to be placed. Of course, the various movements available in the assemblies A as well as the lift platform are available to shift a load from or to one working orientation or position and another more convenient or safe for vehicular transport of the load.

It should be observed as to the vehicle that the represented elevator system E of the truck, with paired cylinders and a substantial vertical clear space therebetween, is preferable as giving greater flexibility to the use of the truck and the loads that may be handled, inasmuch as some part of the load may at times occupy the space between the lateral upright pairs.

In FIG. 5, for handling a particular type of propeller represented only in dashed outline form as LP–a) having substantial mass and an effective diameter of about 22 feet, each assembly A has affixed to its vertical carriage face 33f an offsetting bracket-type load-engaging fitting 55, the two fittings being mirror images.

Each fitting 55 comprises merely an upwardly and forwardly extending heavy plate 55a, of which one face bolted to the baseplate 33f has normal reinforcing plates 55b and 55c; the latter with a projecting rear block 55d embracing the carriage 33c at, and if desired for greater strength bolted to, its front and back faces. A saddle or arcuately shaped piece 55f, by a tongue and groove engagement, supports a pair of slideably adjustable pads 55g secured in selected position for local spaced contact with an appropriate portion of the load, here a portion of the hub.

Thus as the engaged propeller hub portion typically has a tapered exterior, the pads 55g on each of the two fittings involved may be correspondingly differently spaced to accommodate the contour of the hub load; and further by the independent motion possible in the two fittings by virtue of the previously described mechanisms, the fittings may be brought to somewhat different heights with facility and ease of control despite the engaged shape differences in the load.

In FIG. 5, at K there is designated, for example, a projecting portion of the ship hull or keel structure above which the propeller LP–a to be placed or removed, relative to a shaft; which shaft is installed by insertion from, and removed by withdrawing into, the hull interior. Despite this obstruction, the vehicle and fitting may be readily manipulated and moved into and out of position, transversely to the shaft axis, with the load raised relative to the top surface of the base 30 to allow clearance for the structure K, and the entire fixture lifted appropriately. The entire vehicle fitting combination with load, upon backing away from the environment may be lowered, by lowering of the load relative to the base 30, and then lowering the entire fitting on the lift carriage for more convenient, safer and stable transport from one place to another.

Further it is obvious that when the propeller has been brought into position opposite and in alignment with the after end of the propeller shaft both by vehicular and lift movements of the truck and by further complementary motions available in the fixture, then finally by simultaneous transverse motions of the assemblies A, the load may be brought onto the shaft. Any tilting or rotational change in attitude of the axis of the hub relative to the shaft axis, as may be required, is readily attained differentially by virtue of the independent vertical and horizontal motions possible in the assemblies A.

For propeller removal from a fixed shaft, the fixture may have to be brought in from one side beneath the propeller, the truck and assemblies A being manipulated to bring the load fittings into proper relation to the propeller with the platform at such height that the base legs may be adjusted for ground support. Then the platform is lowered to leave the unit ground-supported, with the fittings engaging the propeller; the truck is backed out and, approaching toward the stern, brought in under the base to pick up the fixture unit; so that upon again backing away, the propeller is withdrawn from the shaft.

In FIGS. 6 and 7, the fitting 56 is in general similar to that at 55 in FIG. 5, but somewhat modified to engage another form of propeller load LP–b. In contrast with FIG. 5 where the propeller axis is disposed transversely of the truck, in FIGS. 6––7 the load is more conveniently transported with the propeller shaft parallel to the truck axis near the longitudinal center plane and it can be so transported by bringing the truck platform beneath the fixture base B at right angles to the disposition shown in FIGS. 1, 2, and 5. FIG. 7, incidently shows the fitting supported on the dock floor apart from the vehicle, with the telescoping legs 31 locked in an extended position.

In fragmentary FIG. 8 the vehicle-fixture combination, shown with the same relative orientation as that of FIGS. 1––5, carries a ship's rudder LR by use of appropriate fittings 57 embracing the rudder load from opposite sides, and each with assembly A moved longitudinally towards the middle of the fixture base. Fitting 57 for each assembly comprises a bracket 57a bolted to the corresponding vertical carriage face 33f, and an arm 57 b pivotally mounted on bracket 57a by pivot means including a central vertical pivot pin 57c and carrying at opposite ends load engaging pads 57d similarly mounted to pivot about vertical axes. Preferably, the said pivot means also permits some pivoting about a horizontal axis to further self-adjustment of the pads to the load.

FIGS. 9 and 10 show the cooperative or joint use of two trucks with fixtures F of the type previously described for inserting or removing the ship propeller shaft load LS. Here there is used only one assembly A of each truck-fixture combination, having bolted to its vertical carriage plate 33f a fitting 58 adapted to engage and manipulate the extended shaft.

The fitting 58 includes an outwardly projecting arm 58a, to the outboard end of which is secured, for pivoting about a vertical axis, a channel-spaced saddle or seat 58b (see FIG. 10) adapted in spacing of its upright arms at least to cradle the shaft LS. The cradle portion 58b also may be provided, if desired, with suitable shaft gripping mechanisms, hydraulic or otherwise.

In removing the starboard shaft, for example, each truck (bearing its fixture F disposed on its platform in an orientation at right angles to that shown in FIG. 1) by vehicular motion is brought up at the starboard side and somewhat under the overhang of the stern portion of the vessel, with its assembly A retracted to the extreme right for safety, so that the overhanging fitting 58 lies above the area of the frame of the fixture.

When in the truck positions indicated by FIGS. 9 and 10 the assemblies A in lowermost position are run out to bring the saddles 58b beneath the shaft, and the carriages 33c are raised with any finer adjustments of position being made by the motions available on the fixture F to bring the saddle portions of the fittings into suitable shaft embracing engagement. With the shaft, of course, disconnected from internal mechanism of the vessel and, if such be used, with any ancillary axial thrust imparting equipment in operation, the vehicles can then be backed away from the hull in a direction parallel to the vertical plane including the shaft axis; the carriages 33c gradually being lowered corresponding to the shaft inclination until the forward vehicle fitting is about to encounter the forward strut or bearing support of the shaft. Thereafter without moving the forward truck, the column 33 in its fixture may be retracted towards the center of the base to clear the obstructing strut, and then raised to bring the fitting again into shaft engagement for resumption of backing off motion. When the forward truck load fitting is about to encounter the rearward strut similar maneuvers are repeated to bring the forward fitting behind the rearmost strut; or if the inward excursion of its assembly A has already been completely used in passing the first strut, the forward truck itself may be backed to bring its fitting behind the rear strut.

After further similar motion of the two trucks has carried the shaft clear of the shaft supporting struts, both carriages 33c may be lowered to an appropriate position and moved inwardly to bring the shaft closer to the sides of the respective truck platforms for safer transport to any desired location. In replacing a shaft in the ship obviously a reverse procedure to that above described may be carried out.

In FIGS. 11—12 there are shown further equipment and procedure in accordance with the invention, where the load to be handled is a very large and massive rudder LR–a, beyond the capacity (either in mass or spatial dimensions) of a single truck which might be reasonably designed for general use. Accordingly there is used a single load fixture F–1 of somewhat different form from that previously described.

This fixture F–1 comprises a large central elongated rectangular frame 61, from the longitudinal lateral elements of which extend on each side vertical uprights 62 in turn supporting laterally extending, horizontally coplanar "wings" 63, each adapted to be received as shown in FIG. 12 upon the platform surface of the respective truck. On opposite sides of the longitudinal central load-receiving well thus formed, each respective "wing" or extension 63 mounts a pair of hydraulically actuated clamping assemblies 65. Each of the assemblies 65 is comprised of a rugged A-frame 65a with leg bottoms horizontally coaxially pivoted adjacent the well; a central slideway 65b rigid with the A-frame, from which extends at the A-frame apex an arm 65c which at its upper end carries a load-engaging pad 65d pivoted thereto for pivoting at least about a vertical axis and preferably also about a horizontal axis; and further a hydraulic piston and its cylinder unit 65e with its cylinder base pivoted adjacent the lateral edge of the platform, and its piston rod pivotally connected to the arm 65c. The arm is secured in slideway 65b at selected extension by a suitable pin.

Here again each of the four piston-cylinder units 65e, preferably doubletacting, is provided with suitable hydraulic controls similar to those previously described for independently controlled motion powered by a source on the vehicle, whereby the A-frames with pads may be swung to and fro towards and away from an opposed corresponding assembly for engaging and embracing opposite sides of the load as shown.

Although the very high degree of freedom of complementary motion of the previous form of fixture is not present, nonetheless the independent motion and differential motion possible between the four assemblies 65 contributes to a very useful degree of flexibility of great advantage, inasmuch as the attitude or disposition of the load may be altered to one side or the other with fine control; greatly helpful, for example, in installing or removing the rudder from a vessel.

I claim:

1. The combination of a platform-type industrial lift truck with a load manipulating fixture transportable palletwise, on the platform of said truck;
said fixture comprising:
a palletlike fixture base,
a vertically extended and extensible structure including a vertically movable vertical carriage adapted to support a load-engaging fitting,
a horizontal carriage translatable horizontally on the base independently of carriage vertical movement and horizontally shiftably mounting said structure,
and motor means for moving said vertical carriage vertically on said structure and for shifting said horizontal carriage and therewith said structure relative to the base.

2. A combination as described in claim 1, wherein
said horizontal carriage is shiftable in two horizontal directions at right angles to each other on said base.

3. A combination as described in claim 2 wherein
said vertically extended structure comprises a column selectably securable in a plurality of positions on said horizontal carriage.

4. A combination as described in claim 1, wherein
said structure comprises a first hollow column member secured on said horizontal carriage,
a second hollow column member vertically slideably telescoped thereabout and vertically slideably supporting said vertical carriage as a third hollow member telescoped thereon;
said motor means including, within said first column member, a flexible inextensible element with one end fixed relative to said first member and other end anchored to the third member, and a hydraulic piston-cylinder unit having one end anchored relative to the first member and the other end thrusting against said flexible element.

5. A load manipulating combination as described in claim 3, with said motor means including a respective hydraulic motor for shifting the horizontal carriage in each of said directions.

6. A load manipulating combination as described in claim 4 wherein
two like said horizontal carriages are provided on said base and mounting respective said extended structures to move in directions parallel to each other.

7. A combination as described in claim 6 wherein
said horizontal carriages are each shiftable in two horizontal directions at right angles to each other.

8. A combination as described in claim 7 wherein
each said vertically extended structure comprises a column selectably securable in a plurality of positions on said horizontal carriage.

9. A load manipulating combination as described in claim 8 wherein said motor means includes a respective hydraulic motor for shifting each horizontal carriage in each of said directions.

10. A load manipulating combination as described in claim 1 wherein
two like said horizontal carriages are provided on said base each shiftable in two horizontal mutually perpendicular directions and mounting respective said extended structures thereby movable in directions parallel to each other and also toward and away from each other;
each said structure comprising a first hollow column member selectably securable in different positions on said horizontal carriage, a second hollow column member vertically slideably telescoped thereabout and vertically slideably supporting said vertical carriage as a third hollow member telescoped thereon;
said motor means including, within said first member, a flexible inextensible element with one end fixed relative to said first member and other end anchored to the third member, and a hydraulic piston-cylinder unit having one end anchored relative to the first member and the other end thrusting against said flexible element.

11. A load manipulating combination as described in claim 4 wherein
said base is adapted in form to be handled on the load lift platform of the industrial truck as a four-way pallet.

12. A load manipulating combination as described in claim 1 said fixture base adapted to be received and supported on the truck platform as a four-way pallet.

13. A load manipulating combination is described in claim 4, including a load-engaging fitting secured on said vertically movable carriage.

14. The combination of a platform-type industrial lift truck with a load manipulating fixture transportable palletwise on the load platform of said truck;
said fixture comprising:
a horizontally extended palletlike fixture base whereby the fixture is adapted to be received and transported on said load platform; a support, for a load-engaging fitting, comprising a vertical carriage;
means shiftably mounting said support on the base for independent support displacements in a vertical direction and in at least one horizontal direction comprising a horizontal carriage horizontally shiftable on the base at least in said one horizontal direction, and a column structure on the horizontal carriage and vertically slideably mounting said vertical carriage;
and motor actuated means for effecting said displacements comprising first motor means for shifting the horizontal carriage and second motor means for moving the vertical carriage.

15. A load manipulating fixture as described in claim 14 in combination with a platform-type industrial lift truck, said fixture base adapted to be received and supported on the truck platform as a four-way pallet.

PO-1050
(5/69)

UNITED STATES PATENT OFFICE
CERTIFICATE OF CORRECTION

Patent No. 3,586,190            Dated June 22, 1970

Inventor(s)    James W. Lafferty

It is certified that error appears in the above-identified patent and that said Letters Patent are hereby corrected as shown below:

In the name of the assignee for "The Elwel-Parker Electric Company" read --The Elwell-Parker Electric Company--;

Column 4, line 55, for "tope" read --top--;

Column 5, line 51, for "fire" read --fore--.

Signed and sealed this 21st day of December 1971.

(SEAL)
Attest:

EDWARD M. FLETCHER, JR.　　　　　ROBERT GOTTSCHALK
Attesting Officer　　　　　　　　Acting Commissioner of Patents